C. ESTABROOKS.
Culinary Vessel.

No. 101,244.

Patented March 29, 1870.

Witnesses
R. H. Young
J. E. Young

Inventor
Charles Estabrooks
By J. C. Fay & Co.
Atty

United States Patent Office.

CHARLES ESTABROOKS, OF CALAIS, MAINE.

Letters Patent No. 101,244, dated March 29, 1870.

CULINARY VESSEL.

The Schedule referred to in these Letters Patent and making part of the same.

*To all whom it may concern:*

Be it known that I, CHARLES ESTABROOKS, of Calais, in the county of Washington and State of Maine, have invented a new and improved Utensil for Baking Beans or other Food; and I do hereby declare that the following is a full and exact description thereof, reference being had to the accompanying drawings and to the letters of reference marked thereon.

The nature of my invention consists in the construction and arrangement of an outer case formed of two auxiliary parts, the upper one fitting within the lower, and providing the latter with three or more flexible metallic supports for retaining in position, above the water contained in the lower part of said outer case, the vessel used for baking food.

In the accompanying drawings—

Figure 4:
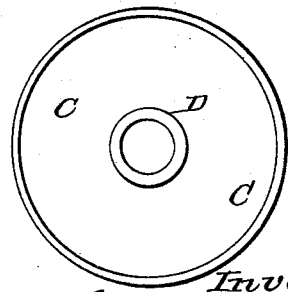

Figure 4, a plan of the inner vessel or baking-pan detached.

Figure 1:
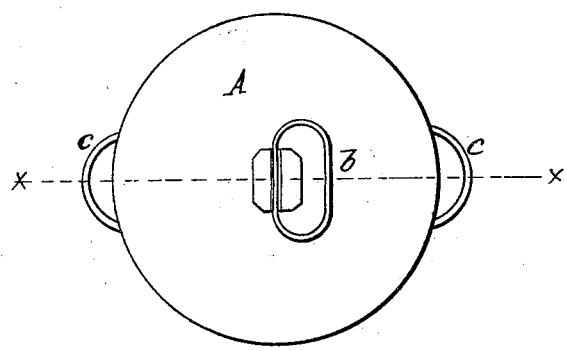
Figure 1 is a plan of my baking utensil.
Figure 3:
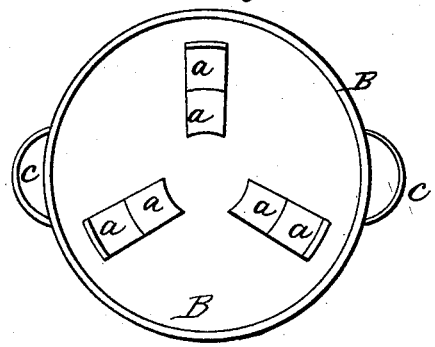
Figure 3 is a plan of the lower section of the outer case detached.
Figure 2:
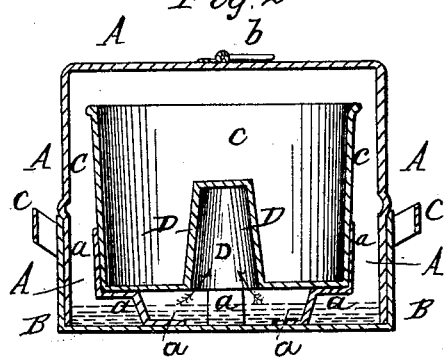
Figure 2 is a central vertical section of the same, taken in the line x-x fig. 1.

The metallic top A is fitted within the lower or bottom vessel B, as shown in fig. 2 of the drawings, and may at will be adjusted therein to any given point, thereby increasing the interior space in which is suspended the baking-pan C.

Secured centrally to the inner face of the bottom of vessel B are three or more flexible metallic supports, a, upon which rests the baking-pan C, having a central hollow stem, D, (closed at its upper end, as shown in fig. 2 of the drawings,) which serves to conduct the heated vapor within the outer case and bring it more thoroughly in contact with the food contained in the center part of pan C, as indicated by the arrows in fig. 2 of the accompanying drawings.

The upper section, A, of the outer case has a central handle, b, secured on the top or upper face thereof, and the lower section, B, is provided with two side handles c c.

This utensil is more particularly designed for baking beans or other food requiring the constant addition of water to keep it from burning, as in the case of beans, rice, &c.; it, however, is adapted to baking any kind of food.

When the utensil is used for baking beans, from their great liability to burn, I prefer to partially fill the lower vessel B with water, so that during the process of baking the steam or vapor arising therefrom will be supplied to the beans, thus saving the trouble of almost constantly adding a fresh supply of water to the beans, (which is the primary cause of destroying their flavor,) the moisture in and around the baking-pan being all that the beans require to insure them from burning, and also greatly aids in more thoroughly and evenly baking the mass throughout.

To accomplish the above result, and at the same time save from any waste in baking beans, the arrangement of parts herein described and shown in the drawings is specially designed.

As the outer vessel A B is placed over the fire or in the oven, it will be seen that the baking-pan C, which is held in suspension within said outer vessel and surrounded with the steam or vapor contained therein, nowhere comes in contact with any surface directly exposed to the heat of the fire.

The object of having the top or upper outer vessel A adjustable by means of extending within the lower vessel B is that the heating surface of the two vessels when combined may be increased or diminished during the process of baking, as occasion requires, without affecting the interior space of the outer vessels, so as to admit any escape of vapor therefrom.

I claim as my invention—

The combination of sections A B, flexible metallic supports a and interior vessel C, when constructed, arranged, and used substantially in the manner and for purpose herein specified.

The foregoing description of my improved utensil for baking beans, &c., signed by me this 20th day of January, 1870.

CHARLES ESTABROOKS.

Witnesses:
JOSIAH H. PINEO,
R. B. DUDLEY.